Dec. 15, 1936.    C. WURM    2,064,050
SOUND GATE
Filed Dec. 24, 1935
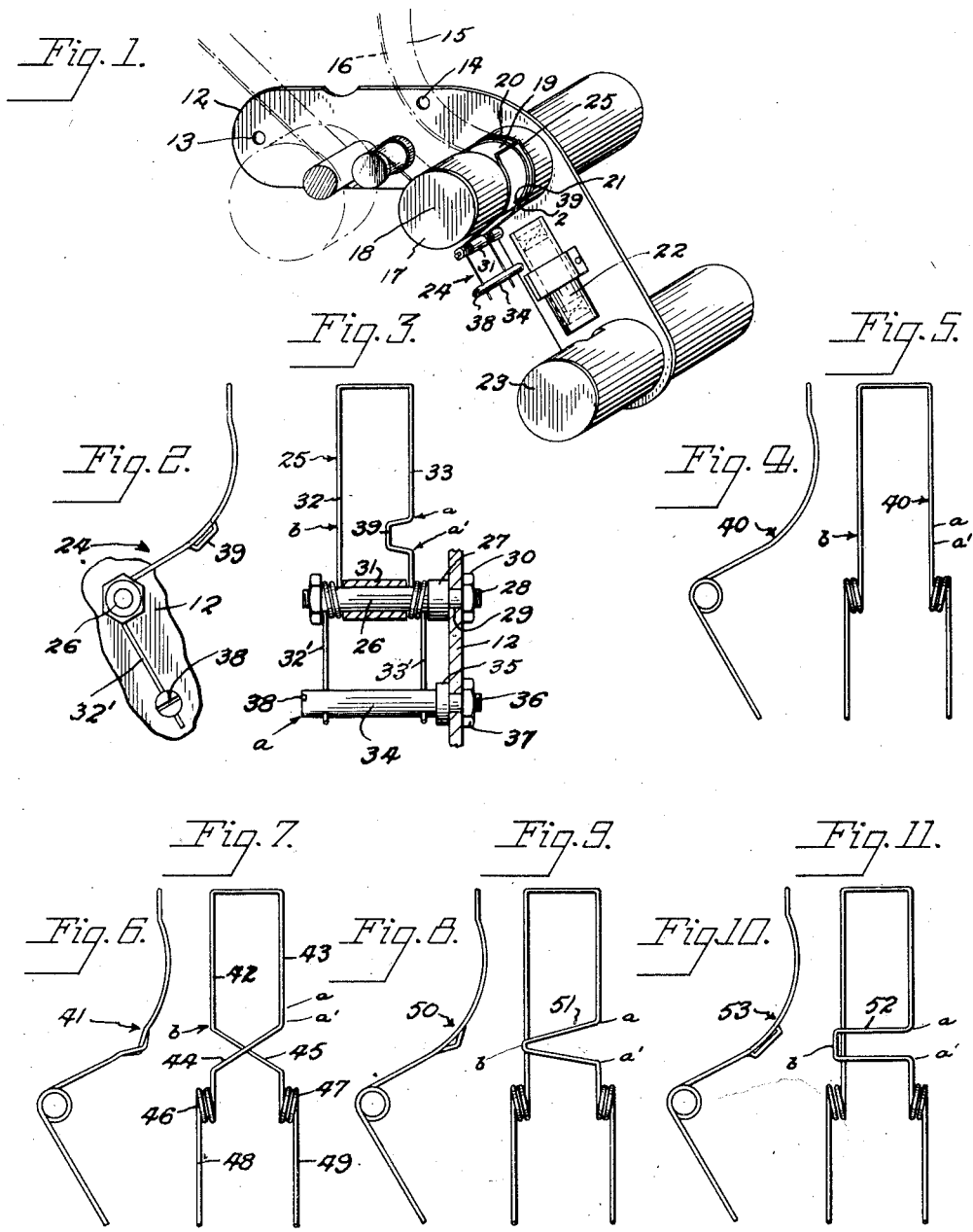
INVENTOR.
BY CARL WURM
Mason Fenwick Lawrence
ATTORNEYS Patented Dec. 15, 1936

2,064,050

UNITED STATES PATENT OFFICE 2,064,050

SOUND GATE

Carl Wurm, Brooklyn, N. Y., assignor to American Sound Producing Laboratories, New York, N. Y., a company Application December 24, 1935, Serial No. 56,120

10 Claims. (Cl. 179—100.3)

This invention relates to improvements in moving picture machines and has more particular relation to improvements in such machines as reproduce sound which has been previously recorded on the photographic film with the pictures.

The object of the invention is to provide means that may be attached to the ordinary moving picture machine to accommodate and reproduce sound as an accompaniment to the pictures themselves.

A further object of the invention is to provide sound producing devices as an accompaniment to moving pictures for the "home" machines.

A still further object of the invention is to provide an attachment for a moving picture machine which will receive the film passing through such machine and reproduce sound therefrom.

Another object of the invention is to provide improved film guiding and pressing devices used in connection with a mechanism for properly guiding the sound track of the film between the source of light and the so-called "photo-electric eye".

In the accompanying drawing forming part of this specification:

Figure 1 is a perspective view of my improved sound producing attachment for a motion picture machine;

Figure 2 is a side elevation of one form of presser foot forming part of the aforesaid attachment;

Figure 3 is a front elevation of the device illustrated in Figure 2;

Figure 4 is a side elevation of another form of the invention illustrated in Figures 2 and 3;

Figure 5 is a front elevation of the device shown in Figure 4;

Figure 6 is a side elevation of still another form of the invention illustrated in Figures 2 and 3;

Figure 7 is a front elevation of the device shown in Figure 6;

Figure 8 is a side elevation of still another modification of a tension device illustrated in the preceding figures.

Figure 9 is a front elevation of the device illustrated in Figure 8;

Figure 10 is a side elevation of a further modification of the tension device illustrated in Figures 2 and 3; and Figure 11 is a front elevation of the device shown in Figure 10.

It has heretofore been the practice to run the 16 m. m. film which is designed for "home" use through a series of guiding, tensioning and holding rollers, in order that the film which contains both the picture "path" and the sound "path" to the side of the same, will be guided accurately past the point where the actuating light to the "photo-electric cell" will be intercepted to a greater or less degree. This, as is well known in the art, is the method of producing sound from the same film upon which the moving picture scenes are recorded.

Because of the very small dimensions of the light obstructing and sound producing imprints on the film near one edge, it is imperative that the film be guided past the light aperture to the "photo-electric cell" in such a way that there is no possibility of the film moving sidewise or buckling in any way, as any such lateral movement or buckling will cause the transmission of light through the "photo-electric cell" to become unintelligible.

This becomes particularly an absolute necessity in the so-called "home" films which are of the 16 m. m. dimension as the space allotted to the sound path is very small and the slightest deviation of the film from its path becomes fatal to proper sound production.

With this thought in mind, and also with the further necessity of producing a cheap structure for "home" use, the present inventor has designed the arrangement and mounting of devices on a single base plate that may be attached to a moving picture machine and has provided a very peculiar spring presser device for holding the film taut over the light transmitting orifice.

The present invention comprises a base plate 12 adapted to be suitably secured to the supporting framework of a motion picture machine by any suitable means passing through the apertures 13 and 14 in the said base plate. The picture machine forms no part of the present invention and is therefore not illustrated herein.

The film 16 after passing through the projecting mechanism of the picture machine, is formed into a loop 16 extending around a tube 17 in which is mounted the photo-electric cell 18. The tube 17 is provided with an annular recess 19 provided at each end with annular flanges 20, only one of which is shown in the drawing. The flanges 20 form supports for the opposite edges of the film; while the shoulders formed by the opposite ends of the recess with these flanges prevent lateral movement of the film during the feeding thereof over the tube 17.

An aperture 21 is formed in the recess 19 in position to permit light to pass therethrough from an optical element 22, suitably supported on the base plate 12 between the aforesaid aperture 21 and a source of light in the tube 23. The film 15 is drawn over the tube 18 by the usual sprocket feed mechanism, not shown herein, forming part of the well-known motion picture machine.

The beam of light is projected by the optical unit 22 through the film as it passes over the aperture 21 in such way that the sound printing upon the film is interposed directly between the beam of light and the aperture 21. The time interval elapsing between the passage of any picture in front of the projecting lens of the picture machine and the passage of the sound path record across the aperture 21, is approximately that required for the passage of twenty-four pictures, since this interval has been found to produce the desired synchronism between the picture and sound.

It will be understood that the film is drawn under proper tension by the usual feed mechanism over the tubes 17. However, since the loop 16 must be maintained, I have provided a presser foot, designated generally by the reference numeral 24, to secure this tension against the tube 17. This presser foot may assume various forms. In all forms, however, I find it preferable to make the foot of spring wire, because this material not only enables the presser foot to be cheaply made, but also enables the parts to be arranged so as to exert desired pressures only on the extreme outer edges of the film, thereby reducing the chances of scratching and marring the surface of the sound track, or any other part of the film as it rides over the tube 17. The emulsion of the film is not touched at any time.

In the preferred form of the invention, the presser foot 24 comprises a length of spring wire bent on itself to form a loop 25, mounted on a rod 26. This rod 26 is formed with a flange 27 at one end, which impinges against the base plate 12. A projection 28 extends from the enlargement 27 through an aperture 29 in the base plate; and this extension 28 is screw-threaded at its end to receive the clamping nut 30, by means of which the rod 26 is secured in position on the base plate.

A sleeve 31 is suitably secured to the rod 26 to space apart the branches 32 and 33 of the loop 25 to correspond with the spacing between the opposite shoulders of the recess 20. The branches 32 and 33 are wound around the rod 26 at opposite ends of the sleeve 31; and the free ends of these branches 32' and 33' are passed through apertures formed in a tension adjusting rod 34. The rod 34 is provided at one end with a flange 35 which seats against the base plate 12 and is securely clamped thereto by means of a screw-threaded projection 36 and a clamping nut 37, as shown in Figure 2 of the drawing. The outer end of the rod 36 is provided with a slot 38 to receive a screw driver or other suitable tool for rotating the rod 34 in order to vary the pressure of the branches 32 and 33 on the opposite edges of the film 16 as it passes over the aperture 21. The clamping nut 37 may, of course, be used to secure the rod 34 in angularly adjusted position on the base plate 12.

The branch 33 of the loop 25 is bent to form an inwardly directed recess 39; and this recess is arranged so as to be directly opposite the sound path of the film as it passes over the aperture 22. The space between the recess 39 and the branch 32 is opposite the picture path of the film, and the straight branch 32 is opposite that part of the film containing the sprocket aperture.

It will be understood that the opposite ends of the recess 39 tend to hold the film perfectly taut over the aperture 21 to prevent any possibility of buckling at this point. Such buckling would be fatal, since the small dimensions of obstruction in the light path cause the slightest divergence of the film to transmit an entirely erroneous sound indication to the "photo-electric eye".

The loop 25 does not follow the curvature of the tube 20 over which the film passes; it touches the film at three points, two of which are on the sound track side holding the film steady as it passes by the aperture in the tube 17. The other side merely acts as a guide for the film and presses it lightly against the flange on the sprocket side thereof. The two points above referred to are those on the opposite ends of the recess 39; while the third point is directly opposite to this recess on the branch 32 of the loop 25.

In the modification shown in Figures 4 and 5, the presser foot designated generally by the reference numeral 40 has the loop formed by parallel branches adapted to be arranged on the supporting rod 26 in position to clear the light apertures leading to the photo-electric cell.

In the form of the invention shown in Figures 6 and 7 the spring loop 41 is formed by branches 42 and 43 having their lower ends 44 and 45 crossed and extended to form the coils 46 and 47, respectively, adapted to be seated on the supporting rod 26, the ends 48 and 49 projecting from the coils 46 and 47, respectively, being adapted for connection to the tension adjusting rod 34 in the manner shown in Figure 2 of the drawing.

In the form of the invention shown in Figure 5, the presser foot 50 is somewhat similar to the presser foot shown in Figures 2 and 3 of the drawing, the only difference being that the recess 39 formed in the branch 33 of the loop in Figure 3 of the drawing, is extended to form a recess 51 clear across the loop and into contact with the other branch thereof. In the modification shown in Figures 10 and 11, the recess 52 formed in the loop 53 has its opposite ends parallel to each other; that is, the recess is U-shaped instead of being V-shaped as in Figure 5 of the drawing.

It will be seen from the above that we provide in a single unit a "talking" attachment for handling combined picture and talking record films and capable of being attached to most of the ordinary forms of moving picture machines now on the market.

The construction is such that the ordinary handling and feeding of the film is in no wise disarranged and the addition of a source of light and the photo-electric cell is such that a mere loop formed in the film and led through the unit, results in the talking portion of the film being made effective in combination with any particular type of moving picture machine.

The holes 13 and 14 in the plate 12 accommodate most of the different forms of picture machines, but if desired, it will be understood that differently located holes or slots may be formed in the plate to adapt the plate to different forms of machines.

It will be seen that the production of the devices above described, has greatly simplified the usual construction of mechanism for handling sound producing films, as this mechanism has heretofore consisted of a series of friction and guiding rollers and feeding devices. This is particularly desirable in the present type of machine for handling the 16 m. m. form of film as simplicity and cheapness are the main factors in the production of such apparatus.

What I claim is:

1. A sound gate comprising a base plate secured to the supporting framework of a motion picture machine, a photo-electric cell tube having an aperture over which film is adapted to travel, a presser foot comprising a length of spring wire bent on itself to form a loop, the outer extremities of the loop adapted to press upon the outer edges of the film as it passes over the cell tube, a rod extending from said base plate having a flange at one end, the ends of the loop encircling said rod and extending therefrom, a pin below said rod mounted in said base plate having apertures formed therein, the ends of said presser foot extending into said apertures and being anchored therein.

2. A sound gate comprising a base plate secured to the supporting framework of a motion picture machine, a photo-electric cell tube having an aperture over which film is adapted to travel, a presser foot comprising a length of spring wire bent on itself to form a loop, the outer extremities of the loop adapted to press upon the outer edges of the film as it passes over the cell tube, a rod extending from said base plate having a flange at one end, the ends of the loop encircling said rod and extending therefrom, a spacer block between the encircled portions, a pin below said rod mounted in said base plate having apertures formed therein, the ends of said presser foot extending into said apertures and being anchored therein.

3. A sound gate, comprising a base plate secured to the supporting framework of a motion picture machine, a photo-electric cell tube having an aperture over which film is adapted to travel, a presser foot comprising a length of spring wire bent on itself to form a loop, and having branches, the outer extremities of the loop adapted to press upon the outer edges of the film as it passes over the cell tube, one of the branches having an offset portion to avoid the aperture in the photo-electric cell tube, the ends of the loop secured to said base plate.

4. A sound gate comprising a base plate secured to the supporting framework of a motion picture machine, a photo-electric cell tube over which film is adapted to travel and having an aperture in said tube through which light passes from said cell, a presser foot comprising a length of spring wire bent on itself to form a loop and having branches, the branches contacting the outer edges of the film as the film passes over the photo-electric cell tube, the outer extremities of the loop forming a guide for said film, a pin extending from said base plate having apertures formed therein, the ends of said branches extending into said apertures and being anchored therein.

5. A sound gate comprising a base plate secured to the supporting framework of a motion picture machine, a photo-electric cell tube over which film is adapted to travel and having an aperture in said tube through which light passes from said cell, a presser foot comprising a length of spring wire bent on itself to form a loop and having branches, the branches contacting the outer edges of the film as the film passes over the photo-electric cell tube, the outer extremities of the loop forming a guide for said film, one of the branches having an offset portion to avoid the aperture in the photo-electric cell tube, a pin extending from said base plate having apertures formed therein, the ends of the said branches extending into said apertures and being anchored thereby.

6. A sound gate, comprising a base plate secured to the supporting framework of a motion picture machine, a photo-electric cell tube over which film is adapted to travel and having an aperture in said tube through which light passes from said cell, a presser foot comprising a length of spring wire bent on itself to form a loop and having branches, the branches contacting the outer edges of the film as the film passes over the photo-electric cell tube, the outer extremities of the loop forming a guide for said film, a rod extending from said base plate having a flange at one end, the ends of the loop encircling said rod and extending therefrom, a spacer block between the encircled portion, a pin below said rod extending from said base plate having apertures formed therein, the ends of the loop extending into said apertures and being anchored thereby.

7. A sound gate, comprising a base plate secured to the supporting framework of a motion picture machine, a photo-electric cell tube over which film is adapted to travel and having an aperture in said tube through which light passes from said cell, a presser foot comprising a length of spring wire bent on itself to form a loop and having branches, the branches contacting the outer edges of the film as the film passes over the photo-electric cell, the outer extremities of the loop forming a guide for said film, one of the branches having an offset portion to avoid the aperture in the photo-electric cell tube, a rod extending from said base plate having a flange at one end, the ends of the loop encircling said rod and extending therefrom, a spacer block between the encircled portion, a pin below said rod extending from said base plate having apertures formed therein, the ends of the loop extending into said apertures and being anchored thereby.

8. A sound gate, comprising a base plate secured to the supporting framework of a motion picture machine, a photo-electric cell tube over which film is adapted to travel and having an aperture in said tube through which light passes from said cell, a presser foot comprising a length of spring wire bent on itself to form a loop and having branches, the branches bent across each other to form an offset to avoid the aperture in the photo-electric cell tube, the outer extremities of the loop adapted to press upon the outer edges of the film as the film passes over the photo-electric cell tube, the outer extremity of the loop forming a guide for said film, a pin extending from said base plate having apertures formed therein, the ends of said branches extending into said apertures and being anchored thereby.

9. A sound gate, comprising a base plate secured to the supporting framework of a motion picture machine, a photo-electric cell tube over which film is adapted to travel and having an aperture in said tube through which light passes from said cell, a presser foot comprising a length of spring wire bent on itself to form a loop and having branches, the branches bent across each other to form an offset to avoid the aperture in the photo-electric cell tube, the outer extremities of the loop adapted to press upon the outer edges of the film as the film passes over the photo-electric cell tube, the outer extremity of the loop forming a guide for said film, a pin extending from said base plate having apertures formed therein, the ends of said branches extending into said apertures and being anchored thereby.

10. A sound gate comprising a curved aperture member and means associated with said curved aperture member to apply marginal pressure to a film positioned on said curved aperture member at only three pivots, two of said points on the margin adjacent the aperture and the third opposed thereto on the opposite margin.

CARL WURM.